United States Patent [19]
Johnson et al.

[11] Patent Number: 6,100,368
[45] Date of Patent: Aug. 8, 2000

[54] PROCESS FOR PRODUCTION OF ACIDIC AQUEOUS SOLUTIONS OF MELAMINE-ALDEHYDE POLYMER HAVING LOW LEVELS OF FREE ALDEHYDE

[76] Inventors: William Bruce Johnson, 12327 Lake Sherwood Ave. South, Baton Rouge, La. 70816; Luke Everett Fontenot, P.O. Box 207, Greenwell Springs, La. 70739

[21] Appl. No.: 08/171,007

[22] Filed: Dec. 21, 1993

Related U.S. Application Data

[63] Continuation-in-part of application No. 07/897,309, Jun. 11, 1992, abandoned.

[51] Int. Cl.$^7$ .......................................... C08G 8/04
[52] U.S. Cl. ..................... 528/232; 528/235; 528/252; 528/254; 528/491; 525/472; 525/509; 524/431; 210/759; 210/763
[58] Field of Search .................................. 528/230, 232, 528/235, 252, 254, 491, 503; 525/472, 509; 524/431; 210/759, 763

[56] References Cited

U.S. PATENT DOCUMENTS

| | | |
|---|---|---|
| 2,559,220 | 7/1951 | Maxwell ........................ 92/3 |
| 3,148,937 | 9/1964 | Ross et al. ................ 8/116.3 |
| 3,535,202 | 10/1970 | Huang ..................... 162/160 |
| 3,819,516 | 6/1974 | Murchison et al. ............ 210/63 |
| 3,929,636 | 12/1975 | Zumbrunn et al. ............ 210/63 |
| 3,957,431 | 5/1976 | Pai et al. ..................... 8/182 |
| 4,104,162 | 8/1978 | Junkermann et al. ........ 210/63 R |
| 4,127,382 | 11/1978 | Perry ........................... 8/181 |
| 4,294,703 | 10/1981 | Wilms et al. ............. 210/631 |
| 4,340,490 | 7/1982 | Junkermann et al. ........ 210/759 |
| 4,447,241 | 5/1984 | Hendrix et al. ........... 8/116.4 |
| 4,612,556 | 9/1986 | Pinot de Moira ........... 346/215 |
| 4,935,149 | 6/1990 | Morse ....................... 210/712 |
| 5,043,080 | 8/1991 | Cater et al. ............... 210/748 |

*Primary Examiner*—Samuel A. Acquah

[57] ABSTRACT

This invention relates to a process for producing acidic aqueous solutions of melamine-aldehyde type polymers, and particularly melamine-formaldehyde polymer, which have significantly reduced levels of free aldehyde. The process involves the addition of hydrogen peroxide and/or iron in the form of ferric ion to the acidification stage of the production of melamine-formaldehyde polymers. When the process is conducted at elevated temperatures, in the range of 150–180° F., iron is not required to cause destruction of the free formaldehyde. At lower temperatures the presence of iron may be required to achieve satisfactory rates of reaction. The process reduces levels of free formaldehyde to less than 0.1% by weight, such that the polymer solution may be used in a variety of applications with reduced environmental risk.

15 Claims, No Drawings

PROCESS FOR PRODUCTION OF ACIDIC AQUEOUS SOLUTIONS OF MELAMINE-ALDEHYDE POLYMER HAVING LOW LEVELS OF FREE ALDEHYDE

This is a continuation-in-part of application(s) Ser. No. 07/897,309 filed Jun. 11, 1992, now abandoned.

FIELD OF INVENTION

This invention relates to an improved process for producing acidic aqueous solutions of melamine aldehyde polymers which have significantly reduced levels of free aldehyde, thereby providing for reduced environmental risk in connection with a variety of uses of the melamine-aldehyde polymers.

BACKGROUND OF THE INVENTION

Aqueous solutions of certain melamine-aldehyde polymers are known to have a wide variety of industrial uses. For example, the desired polymer, sometimes referred to as "active" melamine-aldehyde "resin," is applied to various fabrics to impart a permanent press characteristic to the fabric. The resin is also used in connection with the manufacture of paper products, although this practice has declined in recent years due in part to the problem of free aldehyde in the resin. The resin is known to improve the strength and resiliency of paper products. Melamine-aldehyde resins are also commonly used as flocculating agents in the treatment of wastewater. However, the presence of free aldehyde in the resin creates an additional problem in wastewater treatment. Such resins are also used as "detackifiers" in aqueous systems used to control paint overspray. Resins are also used to form microscopic capsules used in self-contained pressure sensitive copying materials. In each of these uses the presence of free aldehyde creates a problem in the use of the melamine-aldehyde resin. The free aldehyde may have a deleterious effect on the material being treated by the resin, may impart an undesirable odor to the material being treated, and may cause an environmental problem when free aldehyde ends up in process by-products, or in wastewater treated with resin.

The prior art has addressed the free aldehyde problem for a variety of uses of melamine-aldehyde resin. However, most existing methods for removing or destroying free aldehyde involve treatment of the aldehyde-contaminated product or by-product. The prior art does not suggest a method for destroying or removing free aldehyde from melamine-aldehyde resin as a part of the process of production of the resin. Additionally, the prior art only suggests methods for removing the free aldehyde which also causes removal of resin, due to the non specific attack on both free aldehyde and resin by the oxidizing agent.

U.S. Pat. No. 4,447,241 to Hendrix et al discloses the use of melamine-aldehyde resins in the treatment of fabrics to impart a durable press characteristic. After treatment of the fabric with the resin, and oven curing of the resin-impregnated fabric, the fabric is contacted with an oxidizing agent to destroy free and releasable formaldehyde. U.S. Pat. No. 4,127,382 to Perry similarly calls for treatment of the resin-impregnated fabric with a free formaldehyde scavenger. See also U.S. Pat. No. 3,957,431 to Pai et al. U.S. Pat. No. 4,612,556 to Moira involves the treatment of microcapsules made with melamine-formaldehyde to remove free formaldehyde. The microcapsules contain image-generating compounds and are used in self-contained pressure sensitive copying materials.

Some prior art does involve direct treatment of melamine aldehyde resins or similar material prior to the use of the resins. For example, in U.S. Pat. No. 4,935,149 to Morse, a free formaldehyde scavenging agent comprised of urea, acetylacetone and/or glyoxal is added to an aqueous solution of melamine-formaldehyde polymer used as a detackifier in a paint overspray control system. In U.S. Pat. No. 3,723,058 to Reinhardt et al free formaldehyde is removed from a solution of methylolated carbamate, subsequently used to treat fabrics, by reacting the free formaldehyde with phthalimide. This method results in the formation of a precipitate.

Use of hydrogen peroxide with or without an iron catalyst to destroy organic contaminates, including formaldehyde, in wastewater is disclosed by the prior art. For example, U.S. Pat. No. 4,340,490 to Junkermann et al involves destroying phenol and formaldehyde in alkaline wastewater by adding hydrogen peroxide and an iron containing compound. U.S. Pat. No. 4,104,162, to Junkermann et al, discloses removal of formaldehyde from alkaline wastewater using hydrogen peroxide and heat. U.S. Pat. No. 3,929,636 to Zumbrunn involves treating aldehyde contaminated alkaline wastewater with hydrogen peroxide and sulfuric acid.

SUMMARY OF THE INVENTION

This invention relates to a process for producing acidic aqueous solutions of active melamine-aldehyde polymer which have significantly reduced levels of free aldehyde, specifically below 0.1% by weight and preferably below 0.03% by weight. As is well known in the art, melamine-aldehyde polymer may be produced in an acidic aqueous solution by dissolving melamine in an aqueous solution of aldehyde, followed by adding the dissolved mixture to a quantity of dilute acid. Proper manipulation of pH and temperature will result in the formation of active melamine-aldehyde polymers in an acidic aqueous solution. Such solutions typically include an amount of free aldehyde, generally between 0.1% and 1% by weight, and usually between 0.3% and 0.6% by weight. The present invention involves the addition of hydrogen peroxide to the reaction mixture, with or without an iron catalyst, during the acidification step of the production process or shortly thereafter. The resulting melamine-aldehyde product has a significantly reduced level of free aldehyde. Levels in the range of 0.02–0.03% by weight are obtainable using this process.

The advantages of this invention over the prior art include the production of acidic aqueous solutions of melamine-aldehyde polymers in a manner which: results in significantly reduced levels of free aldehyde in the melamine-aldehyde solution product; allows for reduction of free aldehyde levels during the production process of the melamine-aldehyde solution; does not require removal of free aldehyde from the material or product treated with the melamine-aldehyde polymer solution; does not result in the destruction of melamine-aldehyde resin product; does not involve the addition of noxious or deleterious chemicals to the melamine-aldehyde solution product; does not create a precipitate which must be removed from the melamine-aldehyde solution product; is inexpensive and easy to conduct; results in a product having substantial stability and shelf life; and which results in a product which may be used in the treatment of wastewater without creating an environmental risk due to an unacceptable level of free aldehyde. These and other advantages will be evident from the following detailed description of the invention.

DETAILED DESCRIPTION OF THE INVENTION

It has been found that the addition of hydrogen peroxide, with or without a ferric iron catalyst, during or shortly after the acidification stage of the production of melamine aldehyde polymer results in a melamine-aldehyde polymer product which is substantially lower in levels of free aldehyde than product made traditionally.

The most commonly used aldehyde for the production of melamine-aldehyde resins is formaldehyde. Melamine-formaldehyde resin is usually made by dissolving melamine powder in aqueous formaldehyde, and then combining this mixture with a dilute acid solution. Typically, a 30–40% strength solution of aqueous formaldehyde is heated to 170°–180° F. under nitrogen. Approximately 5 pounds of melamine powder per gallon of formaldehyde solution is then added. Once the melamine powder is completely dissolved and the solution is clear, the mixture is added to a dilute solution of acid. Typically, 25–37% hydrochloric acid is diluted 7–25 fold with water to form the dilute acid solution. Approximately 10 gallons of dilute acid solution is used for each gallon of aqueous formaldehyde solution originally utilized. The acid solution is heated to approximately 160° F. and the pH is adjusted to approximately 1.0 to 2.5, and usually near a pH of 1.5. The melamine-formaldehyde solution is then mixed with the acid solution for 30 minutes to 4 hours. The pH of the reaction product is generally in the range of 1.0 to 2.5. Traditional production of melamine-formaldehyde resins would now be complete, and would contain 0.3–0.6% free formaldehyde. The instant invention continues the process by adding an aqueous solution of hydrogen peroxide to the melamine-formaldehyde acid mixture. Approximately 1 to 4% by volume of 35% solution of aqueous hydrogen peroxide maybe used. Ferric ion may also be added as a catalyst. The ion is usually added in the form of a 32% aqueous solution of ferric chloride. Generally 0.01% to 0.1% by weight ferric chloride is added, although higher levels may be used without adverse effect. The crude melamine-formaldehyde product, hydrogen peroxide, and ferric chloride if added, are then mixed for an additional 1 to 2 hours. An exotherm has been noted which raises the solution temperature to 180°–200° F. The highly acidic conditions prevalent when the hydrogen peroxide is added protects the melamine-aldehyde reaction product. The melamine-aldehyde resin forms a salt under pH conditions between 1.0 to 2.5, which protects the resin from attack by the hydrogen peroxide. However, free aldehyde is not protected by highly acidic conditions and is destroyed by the hydrogen peroxide. Once the solution has cooled somewhat it may be transferred to containers for storage or transport. A "blue haze" may be observed, which is indicative of the active resin formation. The free-formaldehyde content of this final product has been found to be less than 0.19% and usually below 0.03%. Stability studies show that the level of free formaldehyde does not appreciably increase for at least 90 days.

A number of other materials were tested in place of hydrogen peroxide, without success. Materials tested included hydrazine, aniline, sodium sulfite, urea, and sodium hypochlorite. Air sparging during the acidification phase was also tested, without success.

The nature and objects of the invention are further illustrated by the results of the following laboratory tests.

In the first series of tests, 200 mls of melamine-formaldehyde resin solution was heated to 155° F., after which 8 mls of 35% hydrogen peroxide and varying levels of ferric chloride were added. The level of free formaldehyde was sampled at 15 minute intervals. The following chart shows the level of free formaldehyde.

| IRON (ppm) | % $H_2O_2$ | % Free Formaldehyde | | |
|---|---|---|---|---|
| | | 15 mins. | 30 mins. | 45 mins. |
| 0 | 0 | 0.256 | 0.256 | 0.256 |
| 170 | 4 | 0.030 | 0.033 | 0.033 |
| 340 | 4 | 0.033 | 0.047 | 0.045 |
| 0 | 4 | 0.024 | 0.024 | 0.024 |

These data indicate that at elevated temperatures, ferric iron is not necessary to promote the reaction. Additionally, it can be seen that the reaction is complete within 15 minutes at 155–170° F. It should be noted that an exotherm of approximately 15° F. occurred (except in the control test).

A second group of tests were conducted, in which the level of hydrogen peroxide was varied. Approximately 200 mls of melamine-formaldehyde resin solution was heated to 155° F., after which varying levels of 35% hydrogen peroxide were added. No ferric iron was utilized. The level of free formaldehyde was determined after 15 minutes of reaction time.

| % $H_2O_2$ | IRON | % Free Formaldehyde after 15 mins. |
|---|---|---|
| 0 | 0 | 0.256 |
| 2.5 | 0 | 0.030 |
| 2.0 | 0 | 0.030 |
| 1.5 | 0 | 0.041 |
| 1.0 | 0 | 0.074 |

These data indicate that levels of hydrogen peroxide of up to 2.0% are needed to achieve maximum destruction of free formaldehyde. Levels higher than 2.0% provide only limited additional benefit.

A third group of tests were conducted using both iron (as ferric chloride) and hydrogen peroxide. The tests were run at room temperature (70°–80° F.). The level of free formaldehyde was determined after 3 hours and again after 24 hours.

| IRON (ppm) | % $H_2O_2$ | % Free Formaldehyde | |
|---|---|---|---|
| | | 3 hours | 24 hours |
| 0 | 0 | 0.256 | 0.259 |
| 0 | 4 | 0.118 | 0.088 |
| 34 | 4 | 0.124 | 0.076 |
| 68 | 4 | 0.109 | 0.070 |
| 102 | 4 | 0.100 | 0.059 |
| 170 | 4 | 0.105 | 0.029 |
| 340 | 4 | 0.091 | 0.029 |

These data show that at lower temperatures the presence of iron is needed as a catalyst. To achieve suitable levels of free formaldehyde within 24 hours, at least 170 ppm iron is required. Where substantial time of reaction is available, such as in storage of the melamine-formaldehyde crude product, free formaldehyde levels may be reduced at ambient temperatures using hydrogen peroxide in combination with iron. Care should be taken to avoid any adverse effect from the small exotherm likely to be experienced, as well as from the possible increase in pressure in a closed storage vessel.

Reduction of levels of free aldehyde in active melamine-aldehyde resins to 0.03% and lower enables increased use of such resins in a variety of industrial applications. Adverse impact upon the environment and upon materials treated with melamine aldehyde resins is minimized by application of the instant invention.

What we claim is:

1. A process for producing acidic aqueous solutions of melamine-aldehyde polymer containing reduced levels of free aldehyde, which comprises adding hydrogen peroxide to the melamine and aldehyde reaction product under pH conditions of between 1.0 and 2.5.

2. The process as defined in claim 1 wherein said aldehyde is from the group formaldehyde, acetaldehyde, butyraldehyde and benzaldehyde.

3. The process as defined in claim 1 wherein from 1.5 to 3.5 moles of hydrogen peroxide per mole of free aldehyde are added to the melamine and aldehyde reaction product.

4. The process as defined in claim 1 wherein the process is carried out at temperatures between 140° and 200° F.

5. The process as defined in claim 1 wherein said hydrogen peroxide is added in the form of an aqueous solution consisting of between 20% and 75% hydrogen peroxide.

6. The process as defined in claim 1 wherein said free aldehyde levels are reduced to below 0.1% by weight.

7. A process for producing acidic aqueous solutions of melamine-aldehyde polymer containing reduced levels of free aldehyde, which comprises adding hydrogen peroxide and an iron catalyst to the melamine and aldehyde reaction product under pH conditions of between 1.0 and 2.5.

8. The process as defined in claim 7 wherein said aldehyde is from the group formaldehyde, acetaldehyde, butyraldehyde and benzaldehyde.

9. The process as defined in claim 7 wherein from 1.5 to 3.5 moles of hydrogen peroxide per mole of free aldehyde are added to the melamine and aldehyde reaction product.

10. The process as defined in claim 7 wherein said hydrogen peroxide is added in the form of an aqueous solution consisting of between 20% and 75% hydrogen peroxide.

11. The process as defined in claim 7 wherein said free aldehyde levels are reduced to below 0.1% by weight.

12. The process as defined in claim 7 wherein said iron catalyst is added in the form of an aqueous solution of ferric ion.

13. The process as defined in claim 7 wherein said iron catalyst is added in the form of an aqueous solution of ferric chloride.

14. An acidic aqueous solution of melamine-aldehyde polymer containing free aldehyde levels below 0.1% by weight produced by a method as claimed in claim 1.

15. An acidic aqueous solution of melamine-aldehyde polymer containing free aldehyde levels below 0.1% by weight produced by a method as claimed in claim 7.

* * * * *